(12) United States Patent
Jandali

(10) Patent No.: US 6,315,938 B1
(45) Date of Patent: Nov. 13, 2001

(54) METHOD FOR FOAMING OR FOAM-COATING COMPONENTS

(75) Inventor: M. Zouheir Jandali, Bielefeld (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/590,042

(22) Filed: Jun. 8, 2000

Related U.S. Application Data

(60) Division of application No. 09/379,214, filed on Aug. 23, 1999, now Pat. No. 6,075,063, which is a continuation-in-part of application No. PCT/DE98/00017, filed on Jan. 7, 1998.

(30) Foreign Application Priority Data

Feb. 22, 1997 (DE) .............................................. 197 07 136

(51) Int. Cl.$^7$ .................................................... B29C 44/06
(52) U.S. Cl. ........................... 264/415; 156/79; 264/46.4; 264/46.5; 264/46.6; 264/420
(58) Field of Search .................................... 264/415, 417, 264/420, 46.4, 46.5, 46.6; 156/79

(56) References Cited

U.S. PATENT DOCUMENTS

| | | | |
|---|---|---|---|
| 3,216,849 | * 11/1965 | Jacobs | 264/417 |
| 3,420,923 | * 1/1969 | Ashworth et al. | 264/420 |
| 4,173,608 | * 11/1979 | Soulier | 264/417 |
| 4,352,854 | * 10/1982 | Siedenstrang et al. | 264/420 |
| 4,507,405 | 3/1985 | Paisley et al. . | |
| 4,853,420 | * 8/1989 | Pham et al. | 264/46.5 |
| 5,128,073 | * 7/1992 | Allen et al. | 264/417 |
| 5,128,175 | * 7/1992 | Yamanishi et al. | 264/415 |
| 5,728,744 | 3/1998 | Okada et al. . | |
| 6,165,300 | * 12/2000 | Elsner et al. | 156/79 |

FOREIGN PATENT DOCUMENTS 26 02 379 * 7/1976 (DE) ..................................... 264/417

* cited by examiner

Primary Examiner—Allan R. Kuhns
(74) Attorney, Agent, or Firm—Herbert L. Lerner; Laurence A. Greenberg; Werner H. Stemer

(57) ABSTRACT

A method for foaming or foam-coating components is used for foaming hollow cavities of double-walled or multiple-walled components or foam-coating component parts with decorative surfaces so as to improve haptic properties of component parts. A material is introduced or applied in an unfoamed state to be foamed through the use of microwave energy. In order to achieve high dielectric losses and to ensure that the heat effect is evently distributed and essentially restricted to the material to be foamed, the material is adjusted in a polar manner by addition of certain substances such as conductive soot. Reflecting agents are used to improve the distribution and effect of the microwaves. The method ensures fully foamed hollow cavities and foam layers of uniform thickness. A foamable material for foaming or foam-coating components is also provided.

6 Claims, No Drawings

METHOD FOR FOAMING OR FOAM-COATING COMPONENTS

CROSS-REFERENCE TO RELATED APPLICATION

This application is a division of U.S. application Ser. No. 09/379,214, filed Aug. 23, 1999, now U.S. Pat. No. 6,075,063 which was a continuation of copending International Application No. PCT/DE98/00017, filed Jan. 7, 1998, which designated the United States.

BACKGROUND OF THE INVENTION

Field of the Invention

The invention relates to a method for foaming or foam-coating components, in which a material inserted into cavities of double-walled or multiple-walled components or located between a surface of a component and a decorative material, is expanded in order to form a foam filling. The invention also relates to a foamable material for performing the method.

There is an increasing demand for components simultaneously having a high rigidity and a reduced weight. The cavities of multiple-walled components are normally filled with foam through the thermal decomposition of an expanding-agent system fixed in the foam-forming polymer material through compounding or through filling in with a foam which is under an over-pressure, which expands in the cavity, and which reacts with moisture from the air and thereby hardens.

Since expansion is already taking place during insertion into the cavities, it is easy for regions not filled with foam to be left in the space to be filled with foam, thereby leading to a considerable reduction in quality. Therefore, in the case of longitudinally extended cavities, cavities formed in complicated structures or large cross-sections, it is necessary to introduce the foam into the component at several places through a number of drillings. That is a method which is not only very complicated but still does not guarantee a uniform foaming.

It is also known to improve the visual effect of components through coating with decorative material such as films, leather or textiles and at the same time to achieve an improved tactile quality. That is done by providing a layer of foam which should possess variable thickness and consistency, between the surface of the component and the decorative material. However, the attachment of a foam backing of that kind which, as is known, proceeds in combination with a decorative material, is associated with difficulties since the foam collapses in strongly shaped regions or, in the case of more rigid foams with greater wall thicknesses, the composite of foam and decorative material cannot be attached crease-free to the component.

In a known method for the fabrication of molded parts with a foam-backed decorative coating having advantageous visual and tactile qualities, the decorative material is first coated at its rear surface with an unfoamed material and after the decorative material has been positioned, the as yet unfoamed or pre-foamed layer on the back surface is expanded through the intrinsic heat of the component to be coated and/or heat applied in addition. As a result of non-uniform conduction of heat or a temperature gradient at the respective component, it is not always possible to ensure a uniform thickness and softness of the layer of foam between the component and the decorative layer.

SUMMARY OF THE INVENTION

It is accordingly an object of the invention to provide a method and a foamable material for foaming or foam-coating components, which overcome the hereinafore-mentioned disadvantages of the heretofore-known methods and materials of this general type and which ensure that cavities are uniformly and completely foamed or filled with foam and that a composite of foam and decorative material has the same thickness and consistency over an entire coated area, even in the case of cavities which are large or of complicated shape and/or in the case of decorative coatings covering a large area.

With the foregoing and other objects in view there is provided, in accordance with the invention, a method for foaming or foam-coating components, which comprises initially inserting a foamable material in a polar state completely into cavities of a double-walled or multiple-walled component or applying the foamable material completely onto the component between a surface of the component and a decorative material; and then heating the foamable material through microwave energy through the use of dipole interaction thereby expanding the foamable material to form a foam filling.

In accordance with another mode of the invention, through realization of a polarity of the foamable material by admixture of a finely divided conductive material, dielectric losses are generated in the foamable material through application of a microwave field so that energy is drawn out of the microwave field and converted into heat directly in the foamable material, thereby causing it to expand. Since the generation of heat is essentially restricted to the foamable material itself or is generated therein through its specific composition, a rapid and uniform heating of all regions of the material can be achieved, i.e. even for large or longitudinally extended volumes. Therefore, the cavities in double-walled or multiple-walled components are filled out completely and uniformly and in the case of coatings, a uniform thickness and softness of the expanded foam is achieved.

In accordance with a further mode of the invention, the polarizing material is soot and/or an ethoxylated amine and/or a monoglycol ester of a fatty acid and/or a diglycol ester of a fatty acid and/or a polyglycol ester of a fatty acid.

In accordance with an added mode of the invention, the uniformity of the expansion is further improved by effecting a distribution of the microwaves through reflection of the same in an ultra-high frequency heating channel on the basis of a resonator chamber system (cavity resonator), thereby achieving a better heat distribution in the expandable material.

In accordance with an additional mode of the invention, the volume of material in the non-expanded state is varied for determining a consistency of the expanded material. In this way it is possible to influence the rigidity of a double-walled component filled out with foam, or the tactile quality of a surface coating.

In accordance with yet another mode of the invention, the expandable material, which is essentially formed through a respective or used ethylene vinyl acetate copolymer, has a vinyl acetate proportion in the range of 15 to 30% in order to enable adjustment of the uniformly distributed softness or rigidity of the foam quality.

In accordance with yet a further mode of the invention, there is provided a method which comprises applying the foamable material to a back surface of a flat decorative material for partial or complete coating of an outer surface of the component, bringing the applied foamable material onto the surface of the component by back-blowing, back-pressing, deep-drawing or similar methods, and then expanding the foamable material.

In accordance with yet an added mode of the invention, the thickness of the expanded layer is adjusted by adjusting the thickness of the non-expanded material.

With the objects of the invention in view there is also provided a foamable material for foaming or foam-coating components, comprising a mixture of:

| | |
|---|---|
| 100 | parts of ethylene vinyl acetate copolymer with a VA content of 0 to 30%; |
| 0.01 to 5.0 | parts of diphenoxydisulfohydrazide; |
| 0.01 to 5.0 | parts of bis-(t-butylperoxyisopropyl)benzene; |
| 0.01 to 10.0 | parts of azodicarbamide; |
| 0.01 to 5.0 | parts of zinc toluene sulfonate; |
| 0.01 to 1.5 | parts of bis-(3,3-bis(4'-hydroxy-3'-t-butylphenyl)butyric acid) glycol ester; |
| 0.01 to 10.0 | parts of trimethylolpropanetrimethacrylate (TRIM); |
| 0.00 to 10.0 | parts of talc; |
| 0.01 to 5.0 | parts of N-N-bis-(2-hydroxyethyl)alkyl amine; |
| 0.00 to 5.0 | parts of glyceryl monostearate; and |
| 0.00 to 25.0 | parts of conductive soot. |

In accordance with a concomitant feature of the invention, the mixture is a powder, granulate, fiber, film, liquid or paste in an initial state.

Other features which are considered as characteristic for the invention are set forth in the appended claims.

Although the invention is illustrated and described herein as embodied in a method and a foamable material for foaming or foam-coating components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENTS

A polymer material formed essentially of an ethylene vinyl acetate copolymer with a vinyl acetate proportion in the range 15 to 30% together with further components in amounts according to the above-mentioned ranges, is inserted in the form of granules through openings in a double-walled metal component into a cavity formed in the same and distributed therein. The component which is thus prepared is then heated in an ultra-high frequency heating channel with a microwave field located in a cavity resonator. Due to the effect of reflection, the microwaves are distributed uniformly over an entire cross-section and length of the ultra-high frequency heating channel and therewith over the foamable material as well. Therefore, strong dielectric losses arise in the expandable polymer material through soot mixed with the same and an intense heating effect consequently occurs in all parts of the material, resulting in a uniform expansion. Since the small volume of non-expanded material was previously able to penetrate into all cavity regions of the double-walled component and since the heating effect is essentially limited to the polymer material and the microwaves can also easily reach all parts of the inserted material as a result of the multiple reflections, a complete and uniform foaming is guaranteed even for large cavities and cavities of complicated shape.

It is advantageous to improve the tactile quality of a surface region of a component, when the surface region is to be coated with a decorative material for purposes of visual presentation. Therefore, a piece of a decorative material which is cut to size and formed of a textile fabric is provided on a rear surface with a polymer material based on vinyl acetate and with conductive soot and further constituents according to the above-mentioned recipe. The decorative material which is prepared in this way is laid on the surface of the component in such a way that the polymer material is located between the fabric and the surface of the component. The component is then transferred into an ultra-high frequency heating channel and the polymer material is uniformly heated as a result of the microwaves being effective in all areas of the surface, and expanded to a thickness corresponding to the thickness of the layer applied. The expanded layer simultaneously enters into a firm bond with the surface of the component and the textile fabric.

I claim:

1. A method for foaming or foam-coating a component, which comprises:

selecting a conductive material as at least one material from the group consisting of soot, an ethoxylated amine, a monoglycol ester of a fatty acid, a diglycol ester of a fatty acid, and a polyglycol ester of a fatty acid;

finely dividing the conductive material to form a finely divided conductive material;

setting a polarity of a foamable material by mixing the finely divided conductive material into the foamable material to give the foamable material a polar state;

inserting the foamable material in the polar state completely into cavities of a double-walled or multiple-walled component or applying the foamable material completely onto the component between a surface of the component and a decorative material; and then heating the foamable material through microwave energy thereby expanding the foamable material to form a foam filling.

2. The method according to claim 1, which comprises carrying out the expansion by reflecting microwaves in a resonator chamber system for further uniformly distributing the energy over a length and cross-section of the foamable material.

3. The method according to claim 1, which comprises carrying out the microwave heating in connection with a hot air channel.

4. The method according to claim 1, which comprises:

selecting EVA copolymer with vinyl acetate content as the foamable material; and determining a uniform softness of the foam by setting the vinyl acetate content in the EVA copolymer.

5. A method for foam-coating a component, which comprises:

initially applying a foamable material in a polar state to a back surface of a flat decorative material for partial or complete coating of an outer surface of the component, bringing the applied foamable material onto the surface of the component by a process selected from the group consisting of back-blowing, back-pressing, and deep-drawing, and then heating the foamable material through microwave energy thereby expanding the foamable material to form an expanded layer.

6. The method according to claim 5, which comprises adjusting a thickness of the expanded layer by adjusting a thickness of the non-expanded material.

* * * * *